United States Patent [19]
Ritter

[11] Patent Number: 5,337,813
[45] Date of Patent: Aug. 16, 1994

[54] HOLDER FOR A THIN-WALLED CARD, ESPECIALLY A BANK CARD, CREDIT CARD, IDENTITY CARD OR THE LIKE

[76] Inventor: Gerhard Ritter, Haller Str. 21, 7100 Heilbronn, Fed. Rep. of Germany

[21] Appl. No.: 970,092

[22] Filed: Nov. 3, 1992

[30] Foreign Application Priority Data

Jul. 31, 1992 [EP] European Pat. Off. ........ 92113044.9

[51] Int. Cl.$^5$ ............................................. A45C 11/18
[52] U.S. Cl. ................................... 150/147; 206/39.4
[58] Field of Search .............. 150/147; 206/39, 39.4, 206/39.5, 37.2

[56] References Cited

U.S. PATENT DOCUMENTS

| | | | |
|---|---|---|---|
| 521,116 | 6/1894 | Ingram | 206/39.4 |
| 865,886 | 9/1907 | Guinn | 206/39 |
| 1,040,051 | 10/1912 | Swihart | 206/39.5 |
| 1,658,496 | 2/1928 | Quarnstrom | 206/39 |
| 2,601,331 | 6/1952 | Segal | 206/37.2 |
| 3,315,799 | 4/1967 | Booker | 206/39 |
| 3,421,658 | 1/1969 | Cooksey | 206/39.5 X |
| 4,301,917 | 11/1981 | Ancell | 206/39.5 |
| 4,697,698 | 10/1987 | Holdener | 206/39.4 |
| 4,792,058 | 12/1988 | Parker | 206/39.4 X |
| 4,852,727 | 8/1989 | Oberle | 206/39.4 |

FOREIGN PATENT DOCUMENTS

| | | |
|---|---|---|
| 251900 | 1/1988 | European Pat. Off. ............. 150/147 |
| 8700307 | 2/1987 | Fed. Rep. of Germany . |
| 3537499 | 4/1987 | Fed. Rep. of Germany . |
| 3718259 | 12/1988 | Fed. Rep. of Germany ...... 150/147 |
| 3926410 | 2/1991 | Fed. Rep. of Germany ...... 150/147 |
| 9103928 | 12/1991 | Fed. Rep. of Germany . |
| 461412 | 12/1913 | France ................................. 206/39 |
| 2638619 | 5/1990 | France ................................. 150/147 |
| 9101096 | 2/1991 | PCT Int'l Appl. ................. 150/147 |

Primary Examiner—Sue A. Weaver
Attorney, Agent, or Firm—Michael J. Striker

[57] ABSTRACT

The holder for a thin-walled card, such as a bank card, credit card, identification card, access control card or the like, which forms a flat protective jacket for the card, has a side panel (1) having an opening (2) extending toward the mouth (16) of the compartment enclosing the card and a slider member (3) slidably mounted in the opening (2) and formed to protect the card held in the compartment. A catch (17) protruding inwardly is provided on an interior rear end (13) of the slider member (3). The catch (17) engages a rear edge of a card inserted in the holder. By sliding the slider member (3) toward the compartment mouth (16) using an operating element (4) extending from the slider member through the opening (2) a card held in the compartment is ejected from the compartment (8). The slider member (3) includes a slidable resilient strip (7) dimensioned so that it covers and can close the opening in the side panel in all positions. The resilient strip (7) presses against an inner wall of the side panel having the opening (2) due to an elastic tension when it is in the holder which keeps the opening (2) closed.

8 Claims, 2 Drawing Sheets

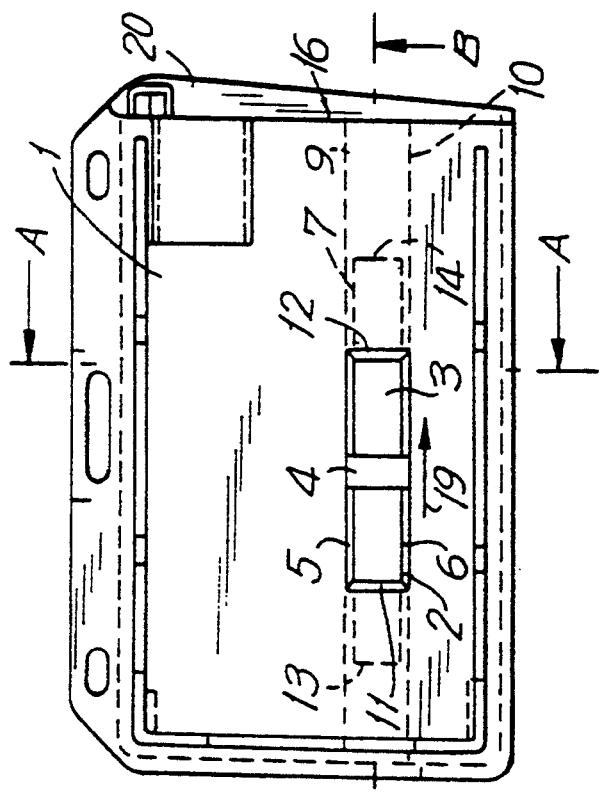
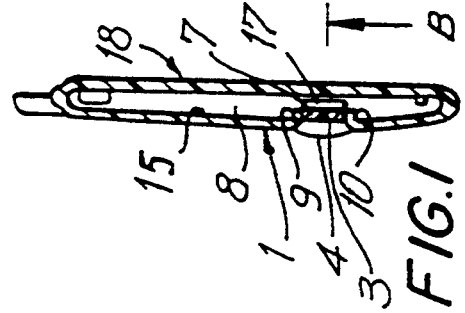
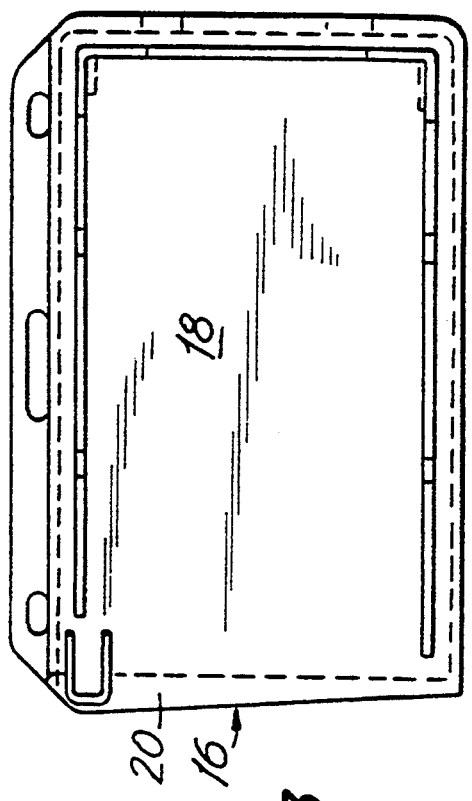

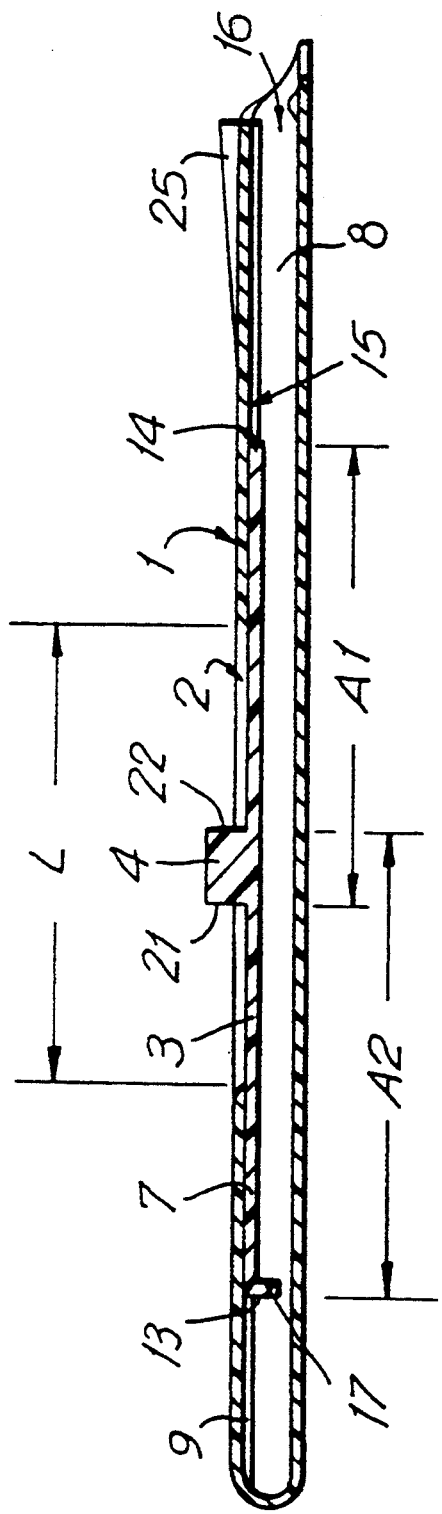
FIG. 4
FIG. 5

HOLDER FOR A THIN-WALLED CARD, ESPECIALLY A BANK CARD, CREDIT CARD, IDENTITY CARD OR THE LIKE

BACKGROUND OF THE INVENTION

The present invention relates to a holder for a bank card, credit card, identity card, access control card and the like thin-walled card.

A holder for thin-walled cards of this type is known comprising a compartment having a compartment mouth at a shorter edge for receiving the card.

This type of holder is described in German Patent G 91 03 928, which has a flat compartment which encloses the thin-walled bank card, credit card, access control card, identity card or the like. These cards are inserted in the comparatively shorter edge of the compartment. The holder made as a single plastic piece from comparatively stiff plastic material which acts as a protective jacket for the card stored in it. To again take out the card inserted in the compartment, the known holder has a gripping opening in one of its side panels which is large enough so that the inserted card can be engaged with the thumb and can be pushed laterally. In the vicinity of the gripping opening the card is thus comparatively accessible, so that no magnetic strip or the like sensitive element which is easily damaged can be arranged on the card at that unprotected position.

SUMMARY OF THE INVENTION

It is an object of the present invention to provide a holder of the above-described type, which completely encloses the card held in it with side panels while still allowing a problem-free removal of the card from the compartment.

These objects, and others which will be made more apparent hereinafter, are attained in a holder for a card comprising a compartment having two side panels enclosing an inserted card, the compartment having shorter peripheral edges, longer peripheral edges and a compartment mouth at one of the shorter peripheral edges.

According to the invention, the holder has a slider member slidable toward the compartment mouth and having a rear end comparatively far from the compartment mouth and a front end comparatively near to the compartment mouth. The slider member has an operating element projecting through an opening provided in one of the side panels so as to be accessible exteriorly and a catch projecting into the compartment and engagable with the card, when the card is inserted in the compartment.

A slider member slidable in the direction of a compartment mouth, which has a catch projecting from it into the compartment, on which the card inserted in the compartment can engage, is located near one of the side panels in the compartment. The operating element projects through the opening in the side panel and can be moved into a removing or delivery position from a receiving position in the direction of the compartment mouth in the opening. The opening, in which the slider member is engaged, is closed completely by the slider member, so that the entire side panel is completely closed in each slider member position and the card in the compartment is completely protected.

The use of a slider member of this type has the additional advantage that a simple manual operation is possible for right handed as well as left handed persons for removal of the card from the compartment.

The catch formed on the slider member protrudes advantageously on this rear end into the compartment and presses against the rear edge of a card inserted in the compartment during ejection of the card from the holder.

The slider member is advantageously guided between two guide pieces arranged on an interior wall of the side panel having the slider member and presses against the inner wall of the side panel having the opening because of an internal tension. The slider member in an uninserted state is slightly convex on the side having the protruding member so that when inserted and held straight in the vicinity of the opening in the side panel it has an internal tension. This elastic tension allows a very simple guide pieces to be used for the slider member, namely simple laterally positioned guide strips.

The operating element of the slider member, which can be designated as a slider knob, overlaps the lateral edges of the opening and the longitudinally extending strip in the compartment extends beyond the boundary edges connecting the lateral edges in all positions so that the slider member is held longitudinally slidable in the vicinity of the opening.

So that the slider member can be inserted from above in the opening in the side panel, the dimensions of the slider member are selected so that it overlaps the edges of the opening only slightly inside the compartment in both of its end positions. On insertion of the slider member from above it is enough that it can bend enough so that it can be inserted through the opening into one of its end positions.

The insertion of the slider member through the opening is particularly easy when one of the shorter peripheral edges of the opening has a bounding edge inclined toward the inner wall of the compartment.

It is particularly advantageous when the upper side panel of the holder is convex. Because of that, the slider member can be fed into the compartment without problems, since the convex curvature raises the compartment height so that enough space exists for both the inserted card and the slider member extending over the card in the compartment. Furthermore the curvature on one of the side panels has the advantage that the very short mouth of the compartment especially in the vicinity of the center of the mouth is comparatively larger than the thickness of the material of the inserted card. The insertion of the card is therefore made easier.

The card enclosed in the holder of the invention is protected on all sides against damage any place on the card. However because of the slider member the card is removable without pressure against the side panel from the compartment. Because of that it is guaranteed that the card is in no way damaged on removal from the holder.

The compartment formed by the side panels is advantageously a single-piece injection-molded plastic part and the slider member also is advantageously a one-piece injection-molded plastic piece.

BRIEF DESCRIPTION OF THE DRAWING

The objects, features and advantages of the present invention will now be illustrated in more detail by the following detailed description, reference being made to the accompanying drawing in which:

FIG. 1 is a front view of the holder for a thin-walled card of the above-described type according to the invention;

FIG. 2 is a cross-sectional view taken along the section line A—A of FIG. 1 of the holder shown in FIG. 1;

FIG. 3 is a rear view of the holder shown in FIG. 1;

FIG. 4 is a detailed cross-sectional view taken along the section lines B—B of FIG. 1 of the holder shown in FIG. 1 enlarged in comparison to FIG. 2; and FIG. 5 is an edge-on view of a slide member of the holder taken from the holder.

DETAILED DESCRIPTION OF THE PREFERRED EMBODIMENTS

The holder shown in FIG. 1 and having shorter peripheral edges 31,31' and longer peripheral edges 33,33' acts as a protective jacket for a bank card or the like thin-walled card and is made of a comparatively stiff plastic material, e.g. of polycarbonate. This material is advantageously stable to UV radiation.

The visible side panel 1 has a rectangular opening 2, in which a slider member 3 is inserted. An operating element 4 protrudes from the upper side of the slider member 3, which overlaps both opposing lateral edges 5,6 of the rectangular opening 2. A resilient strip 7, which is located in the compartment 8 (FIG. 2) of the holder, extends beyond the shorter opening 2 and between guide pieces 9, 10. In FIG. 1 the portion of the inner wall 15 of the side panel 1 covered by the shorter resilient strip 7 is indicated with dashed lines.

Both the opposing lateral edges 5,6, which extend in the direction of the compartment mouth (16), and the boundary edges 11,12 connecting the opposing lateral edges on the shorter sides of the opening 2 are beveled, i.e. inclined downward toward the interior of the compartment. The dimensions of the slider member 3 and the opening 2 are selected so that the slider member 3 can be inserted in the opening 2. During the insertion the resilient strip 7 of the slider member 3 is bent slightly until it fits through the opening 2. Since the rear end 13 and the front end 14 of the slider member 3 extend beyond the boundary edges 11,12 of the opening 2 in every slider member position on the inner wall 15 (FIG. 2) and the operating element 4 overlaps the lateral edges 5,6 of the opening 2, the slider member 3 is held securely, but slidably, on the side panel 1.

The holder has an insertion opening 16 in one of its shorter peripheral edges, 33, through which a card is inserted into the compartment 8. The slider member 3, which has a rectangular catch 17 protruding into the compartment on its rear end 13, is pushed left into the receiving position. In FIG. 1 the slider member 3 is located in a central position between the receiving position and the removing position.

In FIG. 2, which shows the cross-sectional view A—A, the convex curvature of the upper side panel 1 is apparent. Because of the curvature the compartment 8 widens centrally so that the longitudinally extending strip 7 of the slider member 3 together with a bank card to be held in the compartment 8 have sufficient space.

The lower side panel 18 of the holder is seen in FIG. 3. Both side panels 1, 18 form together with the slider member 3 covering the opening 2 a complete enclosure for a card located in the compartment 8. The card is pushed into the compartment 8 far enough so that it does not protrude from the compartment mouth 16. During removal of the card the catch 17 engages on a rear edge of the inserted card and feeds it from the compartment mouth 16 by longitudinal motion of the operating element 4 in the direction of the arrow 19 (FIG. 1). The lower side panel 18 of the card protrudes somewhat in the vicinity of the mouth 16 so that removal of the card is easier. The protruding portion 20 of the side panel 18 forms also an insertion aid, which however is preferred, but not required.

The longitudinally extending strip 7 of the slider member 3 extends below the upper side panel 1 in the compartment 8 shown in FIG. 4. In the uninserted state the longitudinally extending strip 7 of the slider member 3 is curved upwardly as shown in FIG. 5, i.e. a side of the strip 7 having the catch 17 protruding from it is convex. In the inserted state, as shown in FIG. 4, the elastic slider member 3 made of plastic material, is bent to be straight so that it presses on the inner wall 15 as a result of its own internal elastic tension and is held securely between the guide pieces 9,10.

The length L of the opening 2 is slightly shorter than the spacing A1 of the rear end 21 of the operating element 4 from the front end 14 of the slider member 3. Because of that, the slider member 3 completely, but only slightly, covers the opening 2 also in the left end position of the slider member 3 so that the slider member 3 is insertable from above through the opening 2.

The length L of the opening 2 is also shorter than the spacing A2 of the front end 22 of the operating element 4 to the rear end 13 of the slider 3.

It should be noted that a ramp 25 is provided on the upper side panel 1 of the holder, which protects the magnetic strip from damage on insertion of a card with a magnetic strip. The ramp 25 is likewise known as the protective element 26 from the previously mentioned German Patent G 91 03 928.

While the invention has been illustrated and described as embodied in a holder for a thin-walled card, especially a bank card, a credit card, an identification card, an access control card or the like, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

I claim:

1. Card holder, having longer peripheral edges and shorter peripheral edges and comprising two side panels (1) connected with each other so as to form a compartment (8) for holding a card and also a compartment mouth (16) at one of the shorter peripheral edges through which said card is inserted in and removed from said compartment (8), one of said side panels (1) being provided with an opening (2) having opposing lateral edges (5,6) extending in a direction (19) toward the compartment mouth (16), and a resilient strip (7) engagable with said card for removing said card from said compartment (8) when said card is held in said compartment (8) without applying pressure against the side panels (1), said resilient strip (7) being operable from outside said compartment (8) without providing access to said card through said side panels (1) and said resilient strip (7) extending in said compartment (8) in the direction toward the compartment mouth (16) and said resilient strip (7) having a rear end comparatively remote from the compartment mouth (16), a catch (17) protruding into said compartment at said rear end for engaging said card so that said card can be moved together with said resilient strip and an operating element (4) protruding through said opening (2), said operating element (4) having means for holding said resilient strip (7) in said opening (2) and providing means for moving said resilient strip (7) through a plurality of positions in said compartment (8) so that said operating element (4) overlaps the opposing lateral edges (5,6) of the opening (2) and covers said opening (2) in all of said positions of said resilient strip (7) in said compartment;

wherein, when not inserted in the opening and in the compartment, the resilient strip (7) bends so that a side of the resilient strip from which the catch (17) protrudes is convex and, when inserted in the opening and compartment, the resilient strip (7) presses against an inner wall (15) of the side panel (1) due to elastic tension so that the operating element (4) overlaps the opposing lateral edges of the opening (2) and resilient strip (7) closes the opening (2).

2. Card holder as defined in claim 1, wherein the side panel (1) having the opening (2) is outwardly convex so said compartment (8) widens centrally.

3. Card holder as defined in claim 1, wherein the compartment (8) is formed as a single-piece injection-molded plastic part and the resilient strip (7) is an injection-molded plastic piece.

4. Card holder as defined in claim 1, further comprising two guide pieces (9,10) extending in a direction toward the compartment mouth and connected to an inner wall (15) of said side panel having said opening, and wherein the resilient strip (7) is arranged between the guide pieces (9,10) so that the resilient strip (7) is guided slidably by the guide pieces (9,10).

5. Card holder as defined in claim 1, wherein the resilient strip (7) has a width not greater than a width of the opening (2) and the opening (2) has a length (L) in the direction (19) toward the compartment mouth (16) slightly less than a spacing (A1) from a rear end (21) of the operating element (4) to a front end (14) of the resilient strip (7).

6. Card holder as defined in claim 5, wherein the length (L) of the opening (2) is slightly less than a spacing (A2) of a front end (22) of the operating element (4) to the rear end (13) of the resilient strip (7).

7. Card holder as defined in claim 5, wherein the catch (17) protrudes at right angles from the resilient strip (7) and contacts a rear edge of the card when the card is inserted in the compartment (8).

8. Card holder as defined in claim 1, wherein the opening (2) has boundary edges (11,12) connecting the opposing lateral edges (5,6) and at least one of the boundary edges (11,12) is beveled.

* * * * *